United States Patent
Odell

(10) Patent No.: US 7,975,661 B2
(45) Date of Patent: *Jul. 12, 2011

(54) FUEL TUNED VARIABLE VALVE TIMING

(75) Inventor: Marc Odell, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 66 days.

This patent is subject to a terminal disclaimer.

(21) Appl. No.: 12/639,563

(22) Filed: Dec. 16, 2009

(65) Prior Publication Data

US 2010/0101547 A1 Apr. 29, 2010

Related U.S. Application Data

(63) Continuation of application No. 12/179,361, filed on Jul. 24, 2008, now Pat. No. 7,658,171.

(51) Int. Cl.
*F01L 1/34* (2006.01)
(52) U.S. Cl. .............. 123/90.15; 123/575; 123/315
(58) Field of Classification Search .......... 123/1 A, 123/90.15–90.18, 315, 575–578
See application file for complete search history.

(56) References Cited

U.S. PATENT DOCUMENTS

| | | | |
|---|---|---|---|
| 4,392,461 A | 7/1983 | Rotondo | |
| 4,594,201 A | 6/1986 | Phillips et al. | |
| 6,947,830 B1 | 9/2005 | Froloff et al. | |
| 6,990,948 B2 | 1/2006 | Fukuzumi et al. | |
| 7,063,056 B2 | 6/2006 | Nakai et al. | |
| 7,658,171 B1 | 2/2010 | Odell | |
| 2005/0263118 A1 | 12/2005 | Nakai et al. | |
| 2006/0144356 A1 | 7/2006 | Sellnau et al. | |
| 2007/0034186 A1 | 2/2007 | Hefley | |
| 2007/0119417 A1 | 5/2007 | Eng et al. | |
| 2008/0092834 A1 | 4/2008 | Stein et al. | |
| 2009/0222194 A1 | 9/2009 | Bowman et al. | |
| 2010/0024772 A1 * | 2/2010 | Lewis et al. ........... | 123/446 |

FOREIGN PATENT DOCUMENTS

DE 10250771 5/2004
EP 0692613 1/1996

* cited by examiner

*Primary Examiner* — Erick Solis
(74) *Attorney, Agent, or Firm* — Plumsea Law Group, LLC

(57) ABSTRACT

A system and method for fuel tuned variable valve timing is disclosed. The system includes a plurality of cylinders, each cylinder being further associated with at least two exhaust valves. A first exhaust valve operates according to a first valve lift curve that is tuned for combustion of gasoline. A second exhaust valve operates according to at least two different valve lift curves that are tuned for E85 fuel. The second lift curve is associated with high engine speeds and the modified second lift curve is associated with low engine speeds.

20 Claims, 7 Drawing Sheets

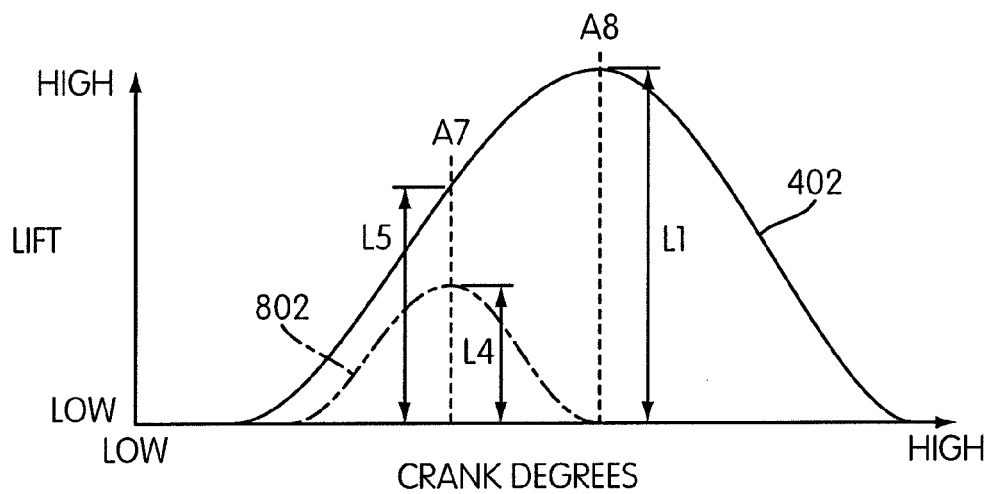
FIG. 8
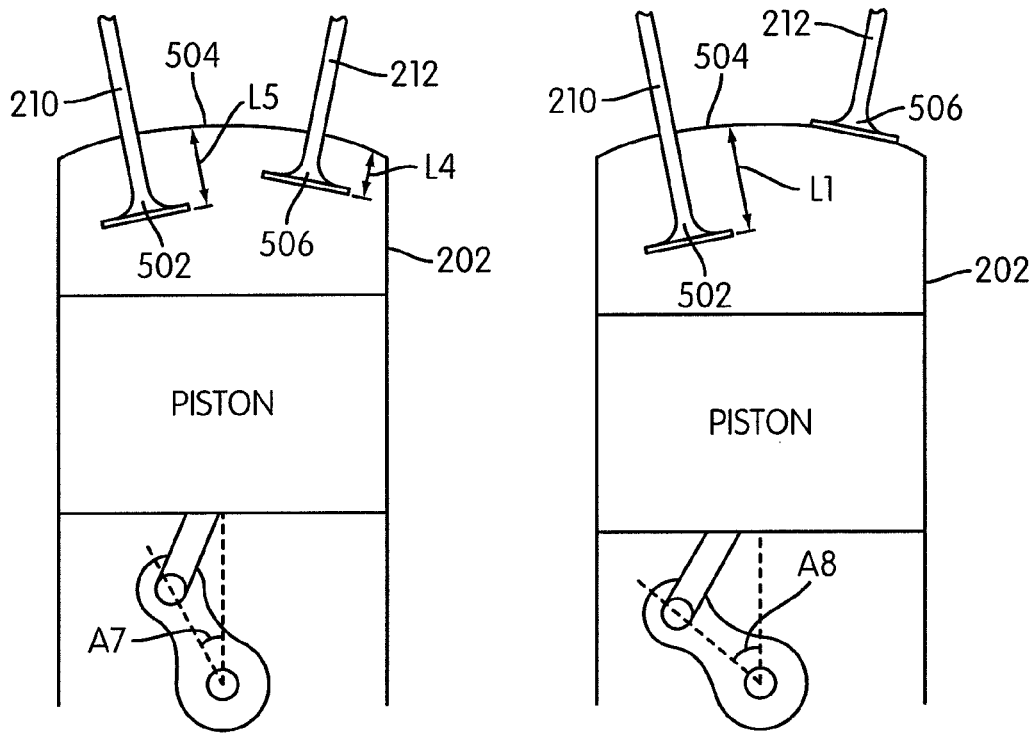
FIG. 9
FIG. 10

FUEL TUNED VARIABLE VALVE TIMING

CROSS REFERENCE TO RELATED APPLICATION

This application is a continuation of U.S. patent Ser. No. 12/639,563, currently U.S. application Ser. No. 12/179,361, entitled "Fuel Tuned Variable Valve Timing", filed on Jul. 24, 2008 and allowed on Sep. 30, 2009, which is incorporated herein by reference in its entirety.

BACKGROUND OF THE INVENTION

1. Field of the Invention

The present invention relates to motor vehicles and in particular to a motor vehicle with fuel tuned variable valve timing.

2. Description of Related Art

Variable valve timing systems have been previously disclosed. Schneider (German patent number 10,250,771) is directed to an engine breaking device for a combustion engine. Schneider teaches a combustion engine with two exhaust valves per cylinder. Schneider also teaches the use of individually switchable valve drives for the exhaust valves that can be selectively changed between at least two different valve lift curves. In particular, different lift curves can be implemented for the individual exhaust valves. Using varying types of lift curves for each exhaust valve, as well as incorporating a blocking unit in the exhaust tract of the engine allows Schneider to vary the degree of engine breaking.

Schneider does not teach a method of optimizing engine combustion for different types of gasoline by using variable valve lift curves. Although Schneider teaches using varying lift curves in order to modify engine braking effects, Schneider does not teach switching between lift curves depending on the current engine speed.

Engines configured to run on various types of fuel have been previously proposed. Phillips et al., (U.S. Pat. No. 4,594,201) is directed to a multi-fuel system for internal combustion engines. Phillips teaches a carburetor that is configured to provide the proper fuel/air ratio for any type of fuel that may be used. The different types of fuels discussed by Phillips include ethanol, methanol, butane and other types of fuels.

Phillips does not teach a method for optimizing combustion for various types of fuels apart from providing a proper fuel/air mixture. In particular, Phillips does not teach the use of variable valve lift systems in an engine that may be used to precisely control air intake and exhaust outlet within the cylinders.

There is a need in the art for a system and method that addresses the shortcomings of the prior art listed above.

SUMMARY OF THE INVENTION

A system and method for fuel tuned variable valve timing is disclosed. Generally, these methods can be used in connection with an engine of a motor vehicle. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy, for example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a motor vehicle including an engine configured to operate with at least two different types of fuel, comprising: a cylinder associated with a first exhaust valve and a second exhaust valve and at least one intake valve; the first exhaust valve operating in a manner that is optimized for a first type of fuel; and where the second exhaust valve is operated in a manner that is optimized for a second type of fuel.

In another aspect, the operation of the first exhaust valve when the first type of fuel is used in the engine is substantially identical to the operation of the first exhaust valve when the second type of fuel is used in the engine.

In another aspect, the operation of the second exhaust valve when the first type of fuel is used is substantially identical to the operation of the second exhaust valve when the second type of fuel is used in the engine.

In another aspect, the motor vehicle includes a fuel sensor configured to sense the type of fuel being used.

In another aspect, the second exhaust valve is deactivated when the first type of fuel is sensed using the fuel sensor.

In another aspect, the first exhaust valve is deactivated when the second type of fuel is sensed using the fuel sensor.

In another aspect, the invention provides a method for operating a motor vehicle including an engine configured to operate on at least two different types of fuels, comprising the steps of: receiving a fuel; controlling a first exhaust valve according to a first lift curve, wherein the first lift curve is optimized for a first type of fuel; controlling a second exhaust valve according to a second lift curve when the engine is operating in a first engine speed range and controlling the second exhaust valve according to a modified second lift curve when the engine is operating in a second engine speed range; and where the second lift curve and the modified second lift curve are optimized for a second type of fuel.

In another aspect, the fuel is gasoline.

In another aspect, the fuel is E85.

In another aspect, the fuel comprises a mixture of gasoline and E85.

In another aspect, the fuel is selected from the group consisting essentially of gasoline, E85 and a mixture of gasoline and E85.

In another aspect, the invention provides a motor vehicle including an engine configured to operate on at least two types of fuel, comprising: a cylinder associated with a first valve and a second valve; the first valve operating according to a first lift curve; the second valve operating according to a second lift curve; where the first lift curve is associated with a first type of fuel and the second lift curve is associated with a second type of fuel; and where the first lift curve is different than the second lift curve.

In another aspect, first valve and the second valve are exhaust valves.

In another aspect, the first valve and the second valve are intake valves.

In another aspect, the first lift curve and the second lift curve are substantially similar in shape.

In another aspect, the second lift curve is out of phase with the first lift curve.

In another aspect, the first lift curve has a first lift that is less than a second lift that is associated with the second lift curve.

In another aspect, the second lift curve is associated with high engine speeds.

In another aspect, the second exhaust valve is operated according to a modified second lift curve for low engine speeds.

In another aspect, the modified second lift curve has a modified lift that is less than the first lit associated with the first lift curve.

In another aspect, the modified second lift curve has a modified duration that is less than a first duration associated with the first lift curve.

In another aspect, the invention provides a motor vehicle including an engine configured to operate on at least two types of fuel, comprising: a cylinder associated with a first exhaust valve, a second exhaust valve and at least one intake valve; the first exhaust valve operating in a manner that is optimized for a first type of fuel; the second exhaust valve operating in a manner that is optimized for a second type of fuel; and where either the first exhaust valve or the second exhaust valve is effectively deactivated at a predefined engine speed range.

In another aspect, a fuel sensor is used to detect the type of fuel disposed within the engine.

In another aspect, the first exhaust valve is effectively deactivated when the first type of fuel is detected by the fuel sensor.

In another aspect, the second exhaust valve is effectively deactivated when the second type of fuel is detected by the fuel sensor.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 8 is an embodiment of two valve lift curves;

FIG. 9 is a side view of an embodiment of a cylinder with two exhaust valves;

FIG. 10 is a side view of an embodiment of a cylinder with two exhaust valves;

DETAILED DESCRIPTION

Figure 1:
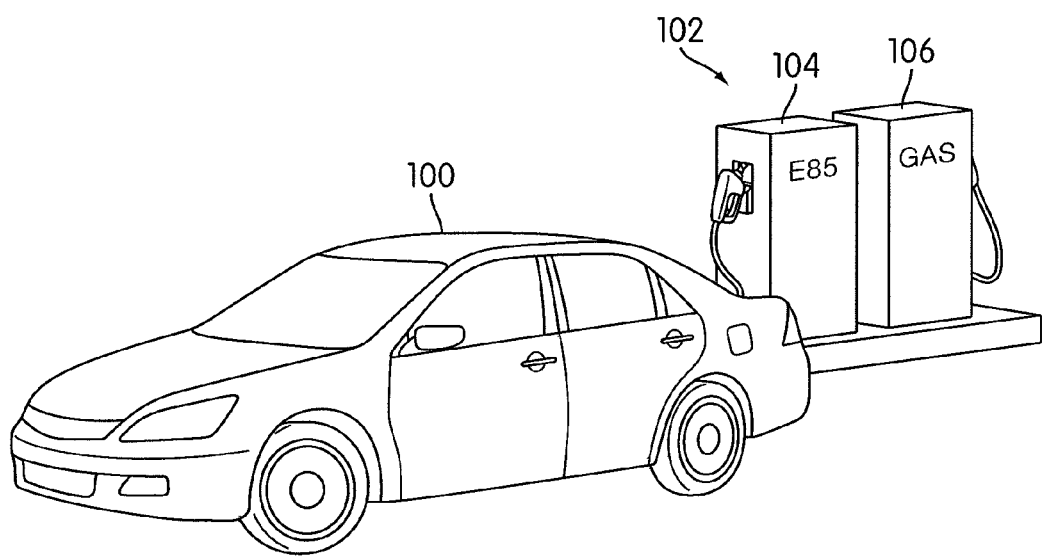
FIG. 1 is an embodiment of a motor vehicle at a pump station.

FIG. 1 is an embodiment of motor vehicle 100 at fuel pump station 102. For purposes of illustration, motor vehicle 100 is shown as a sedan, however it should be understood that in other embodiments motor vehicle 100 could be any type of car, truck or other kind of vehicle.

Fuel pump station 102 may include first fuel pump 104 and second fuel pump 106. Fuel pumps 104 and 106 may be associated with different types of fuel. In this embodiment, first fuel pump 104 may be an E85 fuel pump and second fuel pump 106 may be a gasoline fuel pump. The term 'E85' used throughout this detailed description and in the claims refers to any alcohol fuel mixture that contains up to 85% denatured fuel ethanol and gasoline or another hydrocarbon.

Motor vehicle 100 may include provisions for running on more than one type of fuel. In this embodiment, motor vehicle 100 may be configured to run on gasoline, E85 or any mixture of the two. This arrangement is useful since fuels such as E85 are increasingly used in various parts of the world, including the Midwestern U.S. where E85 can be readily manufactured from corn.

Although some motor vehicles are currently configured with engines that can run on various types of fuels, including alternative fuels such as E85, engines are tuned for efficient combustion using only gasoline. Motor vehicle 100 may include an engine that is configured for efficient combustion of gasoline, E85 or any combination of the two. In an embodiment, the variable valve timing system associated with the engine may include provisions for efficient combustion of different types of fuels.

Figure 2:
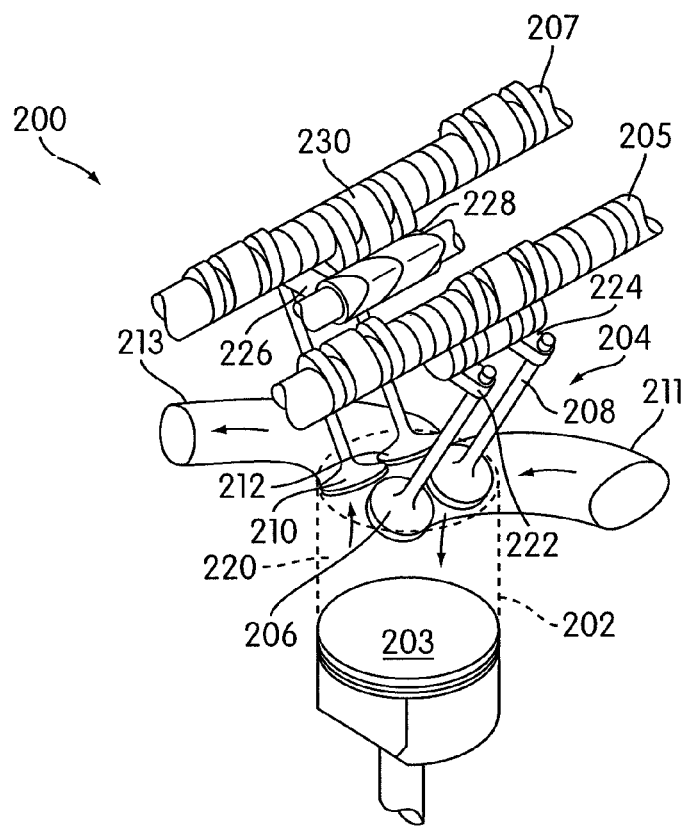
FIG. 2 is an isometric view of an embodiment of a portion of an engine.

FIG. 2 is an embodiment of a portion of engine 200, including cylinder 202 and piston 203. Generally, engine 200 may include any number of cylinders, including three cylinders, four cylinders, six cylinders or a greater number of cylinders. For purposes of clarity, only one cylinder is shown in this embodiment. Engine 200 further includes first camshafts 205 and second camshaft 207.

Cylinder 202 may be associated with valve system 204. Valve system 204 includes first intake valve 206 and second intake valve 208. Intake valves 206 and 208 may be associated with intake manifold 211. In an open position, intake valves 206 and 208 provide fluid communication between intake manifold 211 and combustion chamber 220 of cylinder 202. Valve system 204 also includes first exhaust valve 210 and second exhaust valve 212. Exhaust valves 210 and 212 may be associated with exhaust line 213. In an open position, exhaust valves 210 and 212 provide fluid communication between combustion chamber 220 and exhaust line 213.

Although the current embodiment includes two intake valves and two exhaust valves associated with cylinder 202, in other embodiments a different number of valves could be used. In other embodiments, cylinder 202 includes two or more exhaust valves.

Valve system 204 may be suspended from one or more camshafts. In an embodiment, intake valves 206 and 208 may be associated with first camshaft 205. Also, exhaust valves 210 and 212 may be associated with second camshaft 207. Although an embodiment includes two camshafts, in other embodiments a different number of camshafts could be used. Alternatively, engine 200 could be a cam-less engine in some embodiments.

Valve system 204 may include provisions for opening and closing valves 206, 208, 210 and 212 in a manner that optimizes combustion. In this embodiment, valve system 204 may include first rocker arm 222 and second rocker arm 224 associated with first intake valve 206 and second intake valve 208, respectively. Likewise, valve system 204 may include third rocker arm 226 and fourth rocker arm 228 associated with first exhaust valve 210 and second exhaust valve 212, respectively. Rocker arms 222, 224, 226 and 228 may be configured to push down on valves 206, 208, 210 and 212 in a manner that allows for precise timing of valve system 204.

Rocker arms 222, 224, 226 and 228 may be activated using cams 230 associated with camshafts 205 and 207. As camshafts 205 and 207 rotate, cams 230 generally push down against rocker arms 222, 224, 226 and 228, opening valves 206, 208, 210 and 212. Camshafts 205 and 207 may be connected via a belt to a crankshaft. With this configuration, for the opening and closing of valves 206, 208, 210 and 212 can be timed precisely with a portion of the crankshaft cycle. In other embodiments, rocker arms 222, 224, 226 and 228 could be activated by another method besides cams. In still other embodiments, valve system 204 may include provisions apart from rocker arms to open and close intake and exhaust valves.

Figure 3:
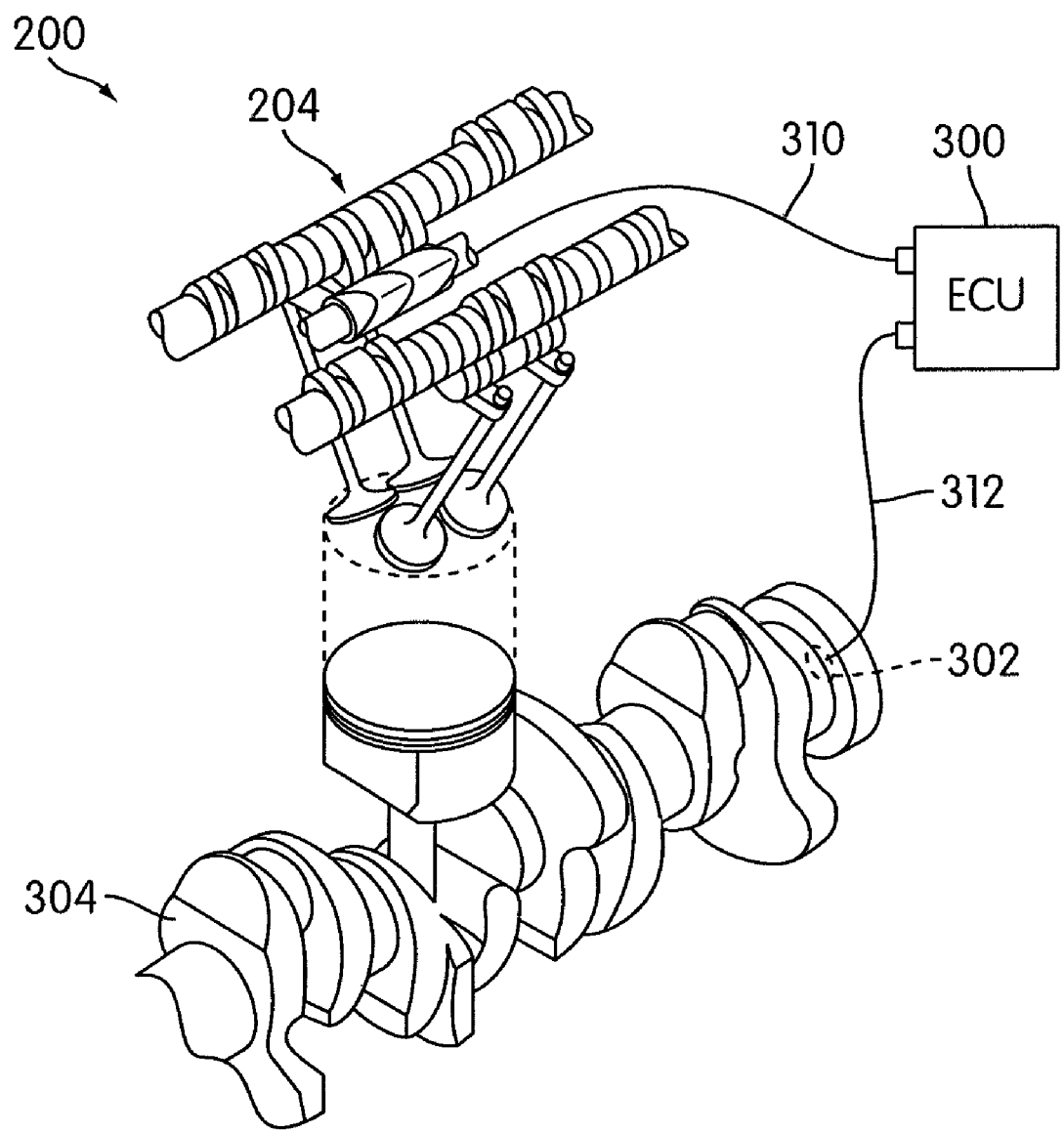
FIG. 3 is an isometric view of an embodiment of a portion of an engine.

Valve system 204 may be in communication with ECU (electronic control unit) 300 as seen in FIG. 3. ECU 300 may be configured to control valve system 204, including the opening and closing of valves 206, 208, 210 and 212. In some embodiments, ECU 300 may also be in communication with crank angle sensor 302 that is associated with crankshaft 304. ECU 300 may be configured to receive information related to engine speed from crank angle sensor 302.

In this embodiment, ECU 300 may communicate with valve system 204 via first connection 310. Likewise, ECU 300 may communicate with crank angle sensor 302 via second connection 312. Connections 310 and 312 may be any types of connections, including wired connections or wireless connections. For purposes of clarity, only two connections are shown here, however, ECU 300 may also be in communication with other components associated with motor vehicle 100, including components associated with engine 200.

Figure 4:
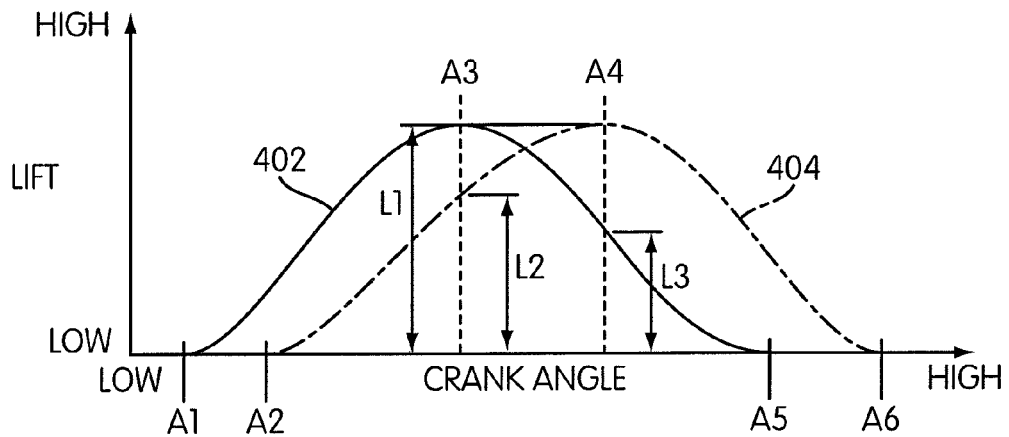
FIG. 4 is an embodiment of two valve lift curves.

FIG. 4 is an embodiment of two valve lift curves associated with exhaust valves 210 and 212. Generally, a 'valve lift curve' is a relationship that relates the angle of the crankshaft to the distance between the valve lobe (the tip of the valve) and the top of the cylinder. In this embodiment, first lift curve 402 is associated with first exhaust valve 210 and second lift curve 404 is associated with second exhaust valve 212. Generally, intake valves 206 and 208 are also associated with valve lift curves that occur for higher crankshaft angles. In some cases, the intake lift curves may intersect the exhaust lift curves, allowing for some valve overlap which is useful for drawing in intake air at the end of a combustion cycle. For clarity, only the exhaust lift curves are shown the Figures.

Following first lift curve 402 from left to right, first exhaust valve 210 is fully closed for low crank angles and then begins to open at crank angle A1. First exhaust valve 210 continues to open until it reaches a maximum extension length L1 at crank angle A3. At this point first exhaust valve 210 is fully opened. As the crankshaft continues to turn, first exhaust valve 210 begins to close at higher crank angles until first exhaust valve 210 is fully closed at crank angle A5. This relationship is cyclical, as first exhaust valve 210 will begin to open again as the crankshaft reaches crank angle A1 at a later time (as the crankshaft rotates through a full revolution). Generally, first lift curve 402 may be characterized by the maximum extension length L1, referred to as the 'lift', as well as by the range of crank angles over which the curve is non-zero, referred to as the 'duration'. The lift corresponds to how much first exhaust valve 210 opens, while the duration corresponds to the amount of time first exhaust valve 210 is open.

In this embodiment, second lift curve 404 is similar to first lift curve 402, with equal duration and lift. However, second lift curve 404 is out of phase with first lift curve 402, so that second exhaust valve 212 does not start opening until crank angle A2, which is larger than crank angle A1. Likewise, second exhaust valve 212 fully closes at crank angle A6, after first exhaust valve 210 has already closed. In other embodiments, second lift curve 402 could have a lift greater that the lift of first lift curve 402.

Figure 5:
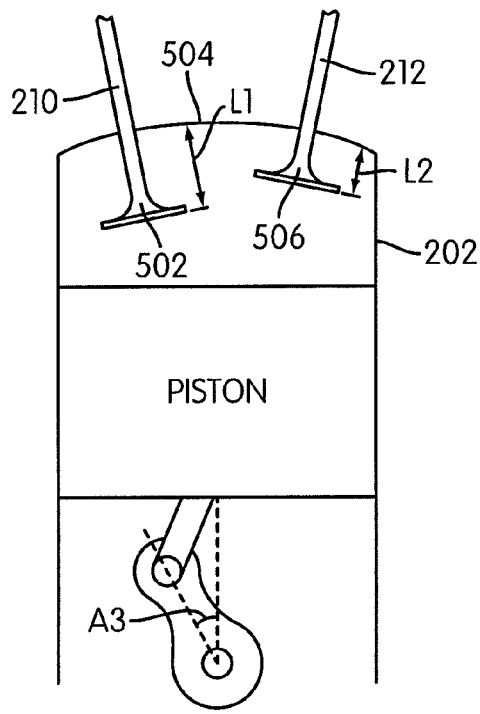
FIG. 5 is a side view of an embodiment of a cylinder with two exhaust valves.
Figure 6:
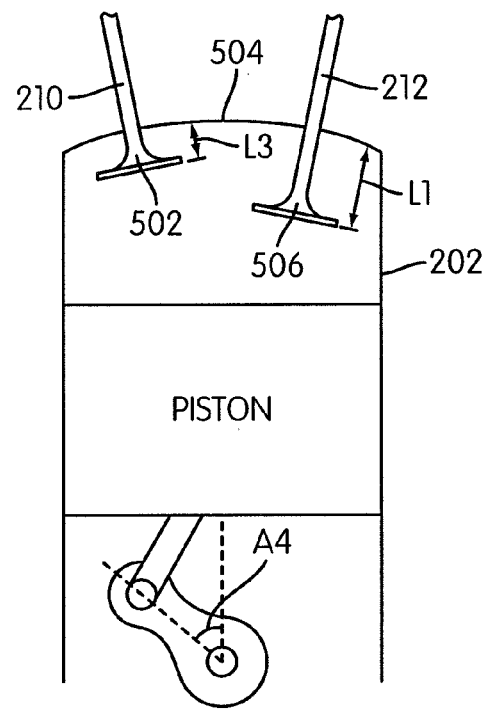
FIG. 6 is a side view of an embodiment of a cylinder with two exhaust valves.

FIGS. 5 and 6 illustrate in an embodiment the physical positions of exhaust valves 210 and 212 for two crank angles A3 and A4. At crank angle A3, first exhaust valve 210 is fully extended so that first lobe 502 is at the maximum extension length L1 from cylinder top 504. Second exhaust valve 212, however, is only partially extended so that second lobe 506 is a distance L2 from cylinder top 504. At a later crank angle A4, first lobe 502 has withdrawn to a distance L3 from cylinder top 504 while second lobe 506 is fully extended at the maximum extension length L1 from cylinder top 504.

It should be understood that cylinder 202 is also associated with intake valves that are not shown here. In particular, the intake valves are generally opening just prior to the closing of exhaust valves 210 and 212, allowing for 'valve overlap'. This valve overlap arrangement helps facilitate airflow from the intake manifold into the combustion chamber, since air within the combustion chamber is still being 'pulled' out through the exhaust line. Furthermore, the intake valves will generally close before exhaust valves 210 and 212 are opened again.

Typically, exhaust valves are in phase, so that two exhaust valves associated with a single cylinder may open and close simultaneously and achieve an identical amount of lift. In some cases, variations in the positions of exhaust valves 210 and 212 throughout the cycle of the crankshaft provide for different mixing characteristics and allow for variations in combustion efficiency. Valve system 204 may include provisions for using different lift curves for each exhaust valve to optimize performance for multiple types of fuel.

In this embodiment, first lift curve 402 is optimized for gasoline. In other words, first exhaust valve 210 may be controlled according to first lift curve 402 so that combustion within cylinder 202 is optimized when gasoline is being used. Likewise, second lift curve 404 is optimized for E85. In other words, second exhaust valve 212 may be controlled according to second lift curve 404 so that combustion within cylinder 202 is optimized when E85 is being used.

Valve system 204 may be a variable valve lift system or variable valve timing (VVT) system. An example of a variable valve timing system can be found in U.S. Pat. No. 6,684,830, the entirety of which is incorporated here by reference. Using a variable valve timing system, valve lift curves may be changed to allow for modified valve timing. This may be useful since valve lift curves are often optimized for a range of engine speeds. By changing the valve lift curves associated with a particular valve (exhaust or intake), combustion can be optimized for different engine speed ranges.

Figure 7:
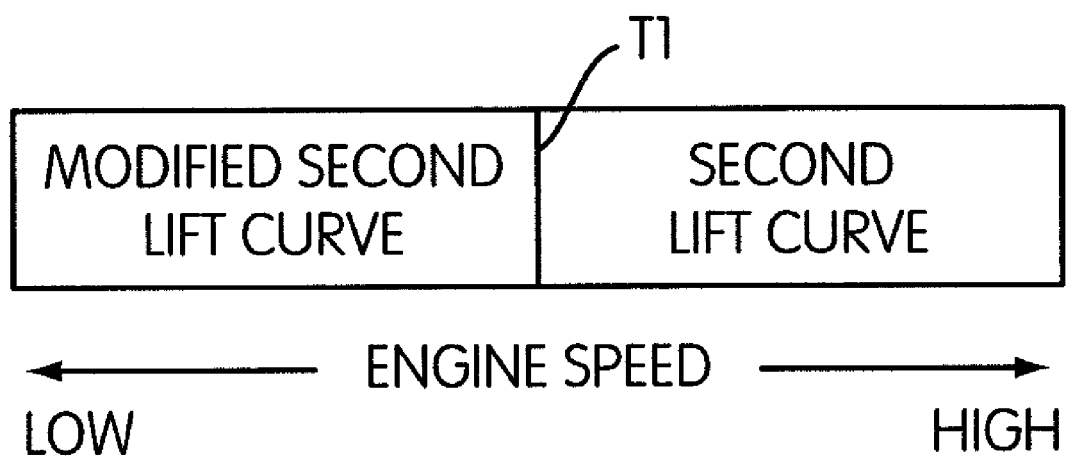
FIG. 7 is an embodiment of a relationship between engine speed and types of valve lift curves.

Referring to FIG. 7, valve system 204 may include provisions for optimizing combustion of E85 over various engine speed ranges. In particular, valve lift curves may be modified to provide different combustion characteristics at different engine speeds. At high engine speed ranges, above threshold speed T1, second lift curve 404, shown in FIG. 4, may be used. Valve system 204 may include provisions for modifying second lift curve 404 at low engine speeds, for engine speeds below threshold speed T1. In this case, a modified lift curve may be used.

FIG. 8 is an embodiment of two lift curves, including first lift curve 402 associated with first exhaust valve 210 and modified second lift curve 802 associated with second exhaust valve 212. First lift curve 402 may remain constant for both low and high RPM operations. However, as seen in FIG. 8, modified second lift curve 802 is much smaller than second lift curve 404 from the previous embodiment. At crank angle A7, first lobe 502 is a distance L5 from cylinder top 504. Also, at crank angle A7, second lobe 506 is maximally extended a distance L4 from cylinder top 504. The relative positions of valves 210 and 212 are shown in FIG. 9.

At crank angle A8, which is larger than crank angle A7, first lobe 502 is at the maximum extension length L1 from cylinder top 504. Second lobe 506, however, is closed at crank angle A8, as shown in FIG. 10. This exhaust valve arrangement reduces valve overlap and provides for more efficient combustion of E85 at low engine speeds.

In other embodiments, modified second lift curve 802 could be made even smaller. In some cases, modified second lift curve 802 could be made small enough so that second exhaust valve 212 is effectively deactivated. The term 'effectively deactivated' as used in this specification and in the claims refers to any substantial reduction in the lift and duration of an exhaust valve as compared to the lift and duration of an opposing activated exhaust valve. In other words, in some cases an effectively deactivated valve may not be completely deactivated, but instead has a lift and duration that is almost zero when compared to the lift and duration of an associated activated exhaust valve. With this configuration, the amount of exhaust that can escape through the effectively deactivated valve is significantly smaller than the exhaust that may escape from the activated exhaust valve.

In the current embodiment, first exhaust valve 210 is operated according to a constant lift curve for all engine speeds. In other embodiments, first exhaust valve 210 could be operated according to lift curves that vary with engine speed, as is done for second exhaust valve 212 in this embodiment.

Figure 11:
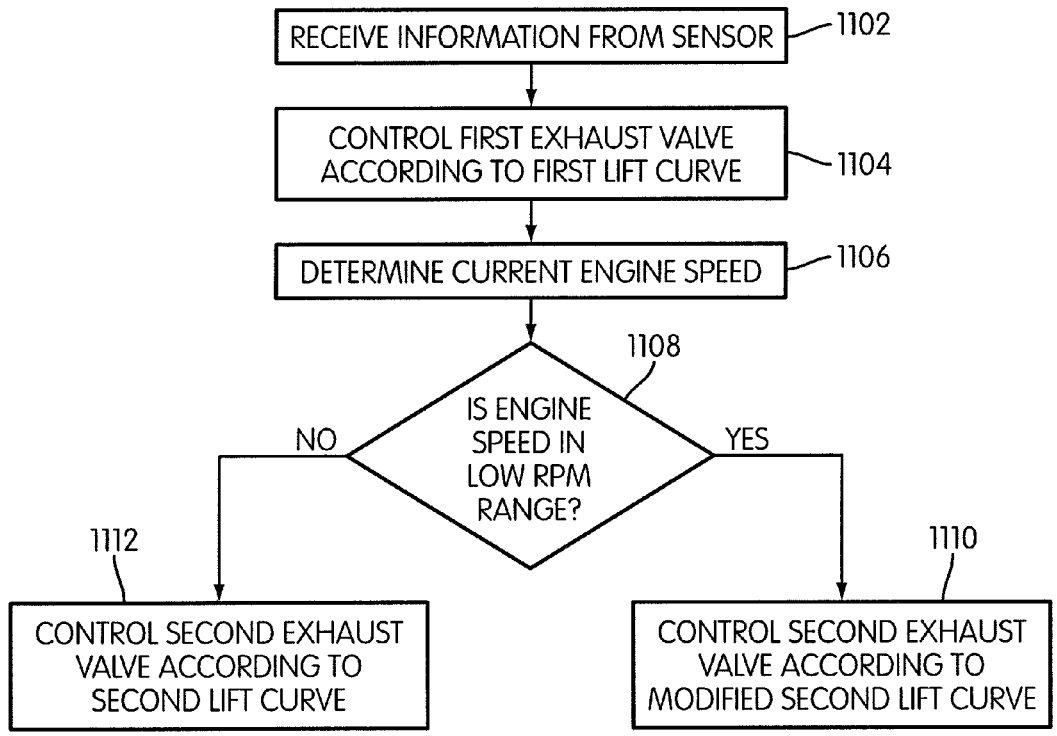
FIG. 11 is an embodiment of a process for controlling a valve system.

FIG. 11 is an embodiment of a process for operating valve system 204. The following steps may be performed by ECU 300, however in some embodiments, some or all of the steps may be performed by other systems and/or devices.

During a first step 1102, ECU 300 may receive information from one or more sensors. In an embodiment, ECU 300 may receive information related to a current engine speed from crank angle sensor 302. In other embodiments, ECU 300 could receive information from additional sensors. For example, in some embodiments, ECU 300 could receive feedback information from valve system 204 via first connection 310.

Following first step 1102, ECU 300 may proceed to second step 1104. During step 1104, ECU 300 may control first exhaust valve 210 according to first lift curve 402. This may be achieved by sending a control signal to valve system 204 via first connection 310. Next, during third step 1106, ECU 300 may determine a current engine speed. In some embodiments, the current engine speed may be determined by receiving information from a crank angle sensor.

Following third step 1106, ECU 300 may proceed to fourth step 1108. During fourth step 1108, ECU 300 may determine if the current engine speed is in a low RPM range (low engine speed range). If the current engine speed is in a low RPM range, ECU 300 may proceed to fifth step 1110. At fifth step 1110, ECU 300 may control second exhaust valve 212 according to modified second lift curve 802. This may be achieved by sending a control signal to valve system 204 via first connection 310.

If, during fourth step 1108, ECU 300 determines that the current engine speed is not in the low RPM range, then ECU 300 may proceed to sixth step 1112. During sixth step 1112, ECU 300 may control second exhaust valve 212 according to second lift curve 404. This may be achieved by sending a control signal to valve system 204 via first connection 310.

Using the configuration discussed here, engine 200 may be optimized for efficient combustion using either gasoline or E85. Furthermore, engine 200 may be optimized for any mix of gasoline and E85. In these exemplary embodiments, the configuration of valve system 204 and engine 200 does not change when different types of fuel are added. Instead, engine 200 may be optimized for both gasoline and E85 simultaneously.

Figure 12:
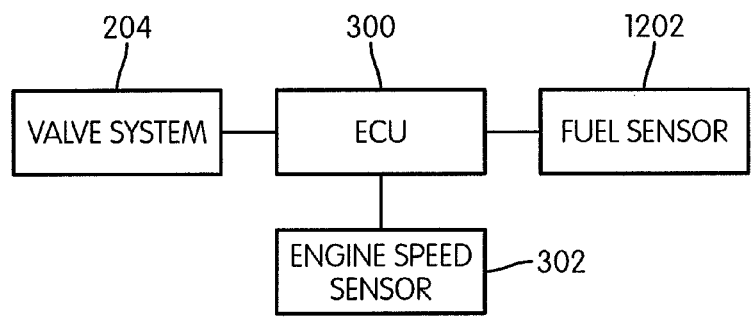
FIG. 12 is an embodiment of a plan view of the connections between an ECU, fuel sensor, valve system and crank angle sensor.

In an alternative embodiment, motor vehicle 100 may include provisions for determining the type of fuel that is currently being used and changing the configuration of valve system 204 accordingly. Referring to FIG. 12, in some embodiments, ECU 300 may be associated with fuel sensor 1202 in addition to valve system 204 and crank angle sensor 302. Fuel sensor 1202 may be configured to distinguish between gasoline and E85. In some cases, fuel sensor 1202 may be configured to determine mixtures of gasoline and E85.

Figure 13:
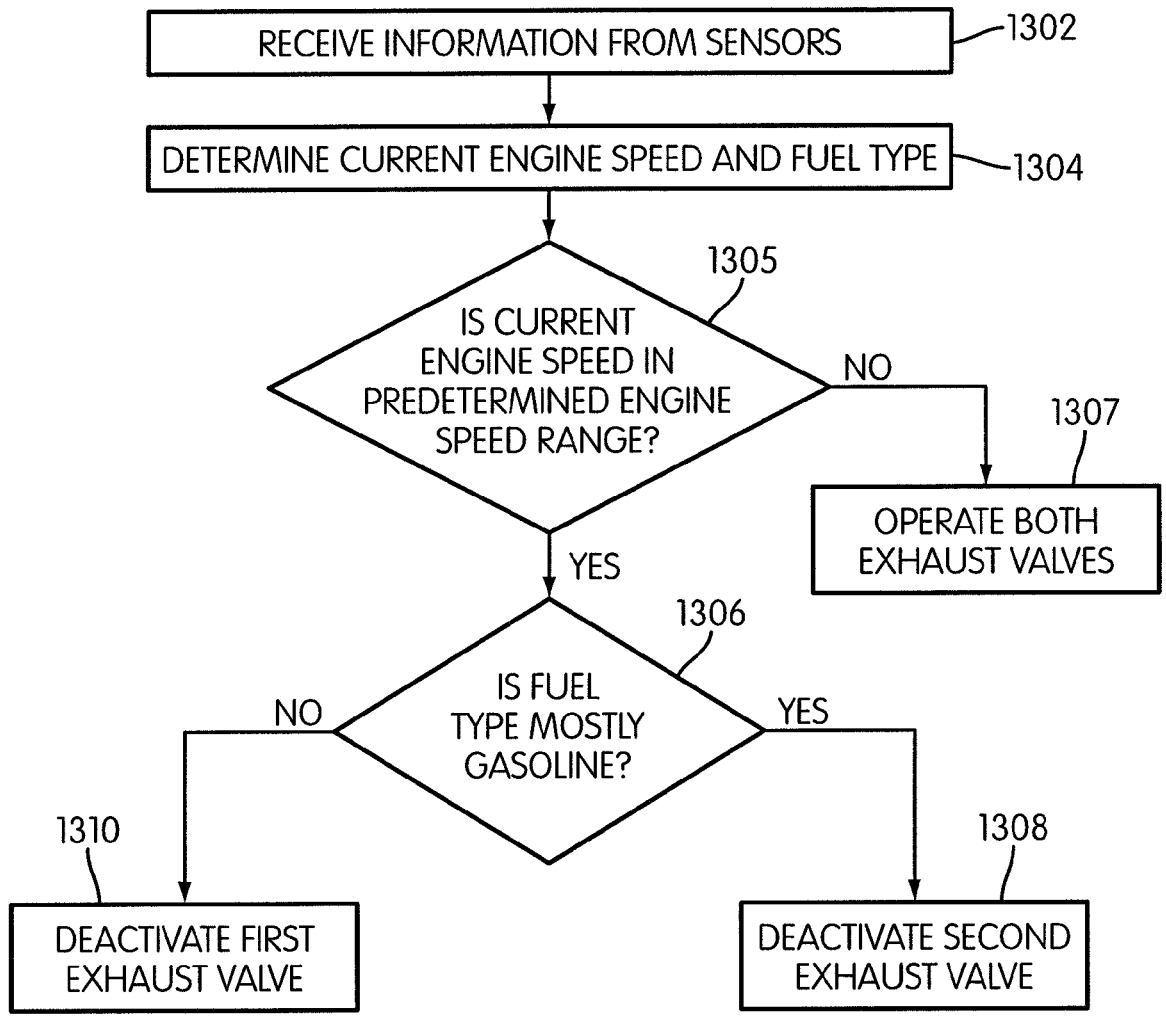
FIG. 13 is an embodiment of a process for controlling a valve system using information received by a fuel sensor.

Valve system 204 may be configured to operate in a manner that is optimized for the type of fuel measured by fuel sensor 1202, especially for a predetermine engine speed range that is associated with optimized performance of engine 200 for a particular type of fuel. FIG. 13 is an embodiment of a process for controlling valve system 204 using information received by fuel sensor 1202. The following steps may be performed by ECU 300, however in other embodiments some steps may be performed by other devices or systems associated with motor vehicle 100.

During first step 1302, ECU 300 may receive information from fuel sensor 1202 and engine speed sensor 302. Next, during second step 1304, ECU 300 may determine the fuel type that has been introduced to motor vehicle 100 according to information received from fuel sensor 1202. Additionally, during second step 1304, ECU 300 may determine the current engine speed according to information received from engine speed sensor 302.

Following second step 1304, during third step 1305, ECU 300 may determine if the current engine speed is in a predetermined engine speed range. If the current engine speed is not in a predetermined engine speed range, ECU 300 may proceed to step 1307, otherwise ECU 300 proceeds to step 1306. In this embodiment, the predetermined engine speed range is a low engine speed range. During step 1307, ECU 300 may operate both exhaust valves 210 and 212 according to lift curves 402 and 404, respectively.

During step 1306, ECU 300 decides if the fuel type is mostly gasoline. The fuel type could be gasoline, E85, or some combination. If the fuel type is mostly gasoline, ECU 300 may proceed to fourth step 1308. During fourth step 1308, ECU 300 may send a control signal to valve system 204 to effectively deactivate second exhaust valve 212. As previously discussed, first exhaust valve 210 may be associated with first valve lift curve 402 that is optimized for gasoline. Therefore, by operating only first exhaust valve 210 during combustion, the combustion is optimized for gasoline.

If, during third step 1306, ECU 300 determines that the fuel type is not mostly gasoline, ECU 300 may proceed to fifth step 1310. In this case, it is determined that the fuel type is mostly E85. During fifth step 1310, ECU 300 may send a control signal to valve system 204 to effectively deactivate first exhaust valve 210. As previously discussed, second exhaust valve 212 is associated with second lift curve 404 and modified second lift curve 802 that are optimized for E85 at high and low engine speeds. In some embodiments, by operating only second exhaust valve 212 during combustion according to lift curves 404 and 802, the combustion may be optimized for E85.

In this embodiment, a single predetermined engine speed range is used for deactivating either exhaust valve 210 or 212. In other embodiments, different engine speed ranges could be used. For example, in another embodiment, first exhaust valve 210 may be deactivated when the current engine speed is in a low engine speed range and the fuel type is E85 and second exhaust valve 212 may be deactivated when the current engine speed is in a high engine speed range and the fuel type is gasoline.

Although this detailed description discusses exhaust valves, it should be understood that the principles applied to the exhaust valves could also be applied to the intake valves. In other words, the intake valves could be configured to operate using various valve lift curves. In some cases, a first exhaust valve could be tuned for E85, while a second exhaust valve could be tuned for gasoline. Furthermore, one or both of these intake valves could be modified according to various operating parameters, such as engine speed, in a similar manner to the method of modifying the valve lift curves for the exhaust valves.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. An engine control system for controlling an engine configured to operate with at least two different types of fuel, comprising:
   a valve system associated with a first exhaust valve and a second exhaust valve and at least one intake valve;
   an electronic control unit in communication with the valve system;
   wherein the electronic control unit sends a signal to the valve system to operate the first exhaust valve in a manner that is optimized for a first type of fuel; and
   wherein the electronic control unit sends a signal to the valve system to operate the second exhaust valve in a manner that is optimized for a second type of fuel.

2. The engine control system according to claim 1, wherein the electronic control unit controls the operation of the first exhaust valve when the first type of fuel is used in the engine to be substantially identical to the operation of the first exhaust valve when the second type of fuel is used in the engine.

3. The engine control system according to claim 1, wherein the electronic control unit controls the operation of the second exhaust valve when the first type of fuel is used to be substantially identical to the operation of the second exhaust valve when the second type of fuel is used in the engine.

4. The engine control system according to claim 1, further comprising a fuel sensor configured to sense the type of fuel being used.

5. The engine control system according to claim 4, wherein the electronic control unit deactivates the second exhaust valve when the first type of fuel is sensed using the fuel sensor.

6. The engine control system according to claim 4, wherein the electronic control unit deactivates the first exhaust valve when the second type of fuel is sensed using the fuel sensor.

7. A method for operating an electronic control unit to control a valve system of an engine configured to operate on at least two types of fuel, comprising the steps of:
   receiving a signal associated with a speed of the engine from a crank angle sensor;
   controlling the valve system to operate a first exhaust valve according to a first lift curve;
   controlling the valve system to operate a second exhaust valve according to a second lift curve when the speed of the engine is in a first engine speed range; and
   controlling the valve system to operate the second exhaust valve according to a modified second lift curve when the speed of the engine is in a second engine speed range.

8. The method according to claim 7, wherein the modified second lift curve has at least one of: a modified lift that is less than the first lift associated with the first lift curve and a modified duration that is less than a first duration associated with the first lift curve.

9. The method according to claim 7, further comprising the step of:
   receiving a signal associated with the type of fuel being used by a fuel sensor; and
   wherein the electronic control unit controls the valve system to operate at least one of the first exhaust valve and the second exhaust valve based on the type of fuel being used.

10. The method according to claim 9, wherein the first lift curve is optimized for a first type of fuel; and
   wherein the second lift curve and the modified second lift curve are optimized for a second type of fuel.

11. The method according to claim 9, wherein the type of fuel is selected from the group consisting essentially of gasoline, E85 and a mixture of gasoline and E85.

12. The method according to claim 9, wherein the electronic control unit controls the valve system to deactivate one of the first exhaust valve and the second exhaust valve based on the type of fuel being used.

13. An engine control system for controlling an engine configured to operate with at least two types of fuel, comprising:
   a valve system associated with a first valve and a second valve;
   an electronic control unit in communication with the valve system;
   wherein the electronic control unit sends a signal to the valve system to operate the first valve operating according to a first lift curve;
   wherein the electronic control unit sends a signal to the valve system to operate the second valve operating according to a second lift curve;
   wherein the first lift curve is associated with a first type of fuel and the second lift curve is associated with a second type of fuel; and wherein the first lift curve is different than the second lift curve.

14. The engine control system according to claim 13, wherein the first valve and the second valve are at least one of exhaust valves and intake valves.

15. The engine control system according to claim 13, wherein the first lift curve and the second lift curve are substantially similar in shape.

16. The engine control system according to claim 15, wherein the second lift curve is out of phase with the first lift curve.

17. The engine control system according to claim 13, wherein the first lift curve has a first lift that is less than a second lift that is associated with the second lift curve.

18. The engine control system according to claim 13, further comprising:

a crank angle sensor for detecting a speed of the engine;
wherein the electronic control unit receives an engine speed signal from the crank angle sensor; and
wherein the electronic control unit sends a signal to the valve system to operate at least one of the first valve and the second valve based on the engine speed signal.

19. The engine control system according to claim 18, wherein the electronic control unit operates the second exhaust valve according to a modified second lift curve for low engine speeds.

20. The engine control system according to claim 19, wherein the modified second lift curve has at least one of: a modified lift that is less than the first lift associated with the first lift curve and a modified duration that is less than a first duration associated with the first lift curve.

* * * * *